United States Patent [19]

Howard et al.

[11] 4,230,501

[45] Oct. 28, 1980

[54] PIGMENTS DISPERSIBLE IN PLASTICS

[75] Inventors: James Howard, Somerset; Oscar J. Gombar, Princeton, both of N.J.

[73] Assignee: Cities Service Company, Tulsa, Okla.

[21] Appl. No.: 929,391

[22] Filed: Jul. 31, 1978

[51] Int. Cl.$^3$ .......................... C04B 31/40; C08J 3/00; C08J 7/00; C09C 3/00
[52] U.S. Cl. ........................... 106/308 Q; 106/308 F; 106/308 M; 106/308 N
[58] Field of Search ............... 106/272, 308 Q, 308 F, 106/308 M, 308 N; 260/42.57

[56] References Cited

U.S. PATENT DOCUMENTS

| | | | |
|---|---|---|---|
| 3,353,974 | 11/1967 | Trimble et al. | 106/272 |
| 3,778,288 | 12/1973 | Ridge et al. | 106/308 Q |
| 4,007,051 | 2/1977 | Gombar et al. | 106/308 Q |
| 4,045,240 | 8/1977 | Wason et al. | 423/335 |
| 4,097,302 | 6/1978 | Cohen et al. | 106/272 |

OTHER PUBLICATIONS

Ridge et al., "Master Batches of Additive Concentrates" abstracted in *Chemical Abstracts,* vol. 82 (1975) #157,894k.

Kirk–Othmer, *Encyclopedia of Chemical Technology,* 2nd Ed., vol. 22 (1970) pp. 169–171.

*Primary Examiner*—Brian E. Hearn
*Attorney, Agent, or Firm*—George L. Rushton

[57] ABSTRACT

The compositions comprise organic or inorganic pigments mixed with a combination of (a) waxy materials such as natural, synthetic, or petroleum waxes and (b) wax-like materials such as polyethylene glycols or hydrocarbon resins. These compositions are easily dispersible in thermoset and thermoplastic resins, require no special equipment, and can be let down directly.

3 Claims, No Drawings

PIGMENTS DISPERSIBLE IN PLASTICS

BACKGROUND OF THE INVENTION

This invention concerns a process for preparing pigment compositions that are dispersible in resins, as well as the resulting compositions. The utility of the invention lies in the preparation of pigmented plastics.

Dispersibility, ease of handling, and high pigment levels are prime requirements for a pigment concentrate to be used in the manufacture of pigmented plastic products for coloring purposes and appearance improvement. Prior art shows that such a concentrate can be prepared by (a) mixing the plastic and the pigment in a Banbury or 2-roll mill, followed by pelletizing, (b) feeding a liquid color concentrate and a virgin resin into an extruder, or (c) mixing the resin and pigment with an additive, such as wax, to give a reasonably homogeneous concentrate. Some examples show that the upper concentration limits reached for various pigments in the concentrates are, in wt.%: carbon black—30–70; iron oxide—75–85; phthalocyanine blue—20–50; benzidine yellow—20–50; and $TiO_2$—50–80. Such pigmented plastic products are disclosed in U.S. Pat. Nos. 3,449,291; 3,775,357; 3,778,288; and 3,844,810.

But these prior art methods have the disadvantages of additional equipment needed for milling, pelletizing and metering, the need for intermediate letdown, and the fact that most concentrates are prepared for only one kind of plastic, such as polypropylene or polyvinyl chloride. All these disadvantages add to the cost of preparing the pigment concentrate.

SUMMARY OF THE INVENTION

Our invention overcomes these disadvantages by requiring fewer pieces of processing equipment, requiring a lower energy expenditure for the preparation, and being suitable for a wide range of plastics, both thermoplastics and thermosets. Our pigment composition, which is readily dispersible in plastics, without intermediate letdown, comprises (a) a majority, by weight, of an organic or inorganic pigment and
(b) a lesser amount, compared with (a), of a waxy material formed from a mixture of
 (I) at least one of the substances selected from the group consisting of waxes selected from the group consisting of natural waxes, synthetic waxes, and petroleum waxes, and
 (II) at least one of the wax-like polymers selected from the group consisting of polyethylene glycols and hydrocarbon resins.

The method of preparing this pigment composition comprises the steps of (a) mixing the components of the composition, (b) fusing the mixture so that the waxy substance coats, or at least partially coats, the pigment particles, and (c) milling the mixture, to give a composition in which the particles have a size range of about 0.01–4.00 microns.

DETAILED DESCRIPTION OF THE INVENTION

The pigments of the invention broadly encompass any of the powdered solid substances normally used in the industry for coloring, opacifying, improving the appearance of, or otherwise modifying a specific property of the formulation of finished composition in which the pigment is employed. These powdered substances include both organic and inorganic pigments, such as inorganic prime pigments, organic prime pigments, various inert or extended pigments, and various carbon blacks. Exemplary of the commonly used general classes of organic pigments are; (a) the azo pigments, such as toluidine red and para reds; (b) triphenylmethane pigments, such as malachite green; (c) xanthene pigments, such as rhodamines; (d) thiazole pigments; (e) quinoline pigments; (f) anthraquinone pigments; (g) various phthalocyanines; (h) oxazines; (i) alkali pigments, such as alkali blue; and (j) quinacridones. The inorganic pigments are likewise represented by oxides of zinc, lead, antimony, and titanium, the ferri-ferrocyanide blue pigments, the chromates, various green pigments comprising mixtures of a chromate yellow and ferri-ferrocyanide blue, generally referred to as chrome green, cadium pigments and the various iron oxides. The carbon blacks are generally classified in terms of the process by which they are made, such as channel, furnace, thermal and lamp black. The above pigments can all be readily prepared in particulate form having a suitable particle size. Typically, the particle size of carbon black ranges from about 10 m$\mu$ to about 100 m$\mu$, while iron oxide particles vary from about 0.1$\mu$ to about 4.0$\mu$. The particle sizes of other pigments generally fall between those of carbon black and iron oxide.

The additives used with the pigments, resulting in a composition easily dispersible in resins, are waxy or wax-like materials.

These additives are selected from the group consisting of
(1) waxes selected from the group consisting of
 (a) natural waxes,
 (b) synthetic waxes, and
 (c) petroleum waxes, and
(2) polymers selected from the group consisting of polyethylene glycol (PEG) and hydrocarbon resins.

Historically, wax has been defined as a substance of animal origin, containing esters and other organic compounds. The esters are typically formed from high molecular weight fatty acids and high molecular weight alcohols other than glycerol. In this invention, we use the term "wax" to include various waxy and wax-like substances, as listed above and expanded below.

Natural waxes include those from animals, such as spermaceti, stearic acid and its derivatives, and beeswax, from vegetables, such as carnauba and palm, and from minerals, such as montan.

Synthetic waxes are synthetic hydrocarbon waxes and their derivatives, and include waxes from the Fischer-Tropsch process, waxes from the Zeigler process, polyethylene waxes and polyethylene-containing copolymers (such as ethylene-vinyl acetate copolymer), and fatty acids amides.

Petroleum waxes include paraffin wax and microcrystalline wax.

Straight waxes or blends of the above materials can be used.

Wax-like polymers for this invention are selected from the group consisting of polyethylene glycols (PEG) and hydrocarbon resins.

There are many materials known as PEG. These can range from low molecular weight, oily liquids to high molecular weight, waxy solids, and they are well-known articles of commerce. Broadly, most of these polyethylene glycols can be used in this invention, but certain practical limits rule out those materials at each extreme of the molecular weight range, since both the high and the low molecular weight materials are difficult to blend into the resin. In the plastics trade, PEG's are typically segregated by "grades", with a numerical grade indicating a nominal molecular weight but having a range of weight within this grade. Thus, a grade 6000 to about 7500, while a grade 1540 has a range of about 1300–1600.

PEG's in the molecular weight range from about 600 to about 20,000, preferably from about 1300 to about 7500, can be used in the composition of this invention.

Hydrocarbon resins are typically thermoplastic resins of low molecular weight made from relatively impure monomers derived from coal-tar fraction, cracked petroleum distillates, and turpentine, such as resins of coumarone-indene, cyclopentadiene, petroleum, and terpene. There are also some naturally-occurring hydrocarbon resins. It is to be noted that the hydrocarbon resins concerned with this invention are not to be considered as the thermoplastic resins that are ultimately mixed with the pigment concentrates. Although the hydrocarbon resins of this invention are not truly wax-like, we prefer to include them in the category because they serve to coat the pigment particles as do the PEGs, they can be used singly or in combination with the PEGs, and they are one of the necessary ingredients of the pigment composition.

The resins in which the pigment composition of this invention can be used include a wide range of thermosets and thermoplastics. Examples of these include polyesters and epoxies as thermosets, and polyethylene, polypropylene, polystyrene, ABS (acrylonitrile-butadiene-styrene), and poly vinyl chloride as thermoplastics. We define resins as polymers before compounding, and plastics as polymeric material in final molded shape.

It is realized that other additives can be added to resins to improve specific properties. For example, polyethylene resin for film use typically has anti-bloc, slip, and anti-static additives incorporated. And flame retardants, plasticizers, antioxidants, fillers, etc., are other additives typically used in the plastics industry. It is emphasized that the additives used with the pigments as a portion of the composition of this invention are considered separately from the additives typically added for other reasons. Thus, the finished pigment composition of the invention is made up of two parts or portions—a pigment and a waxy material. Other substances added later are not part of the invention.

The relative amounts of pigment and waxy substance used in the composition vary over a range, due to the varying properties of the pigments and the resins into which the pigment compositions are incorporated. Since the main aim of a pigment concentrate is to have the highest possible pigment loading, it follows that the pigment is the major component of the composition. Broadly, the composition comprises, by weight, a majority of an organic or inorganic pigment and a lesser amount (compared with the pigment) of a waxy substance. The amount of pigment can vary from about 51 to about 85 wt.% of the finsihed composition, depending on the pigment. For example, a carbon black concentrate can have from about 60 to about 80 wt.% of carbon black; in an iron oxide concentrate, the concentration of oxide can vary from about 75 to about 85 wt.%; phthalocyanine blue and benzidine yellow pigment loadings each can vary from about 60 to about 70 wt.%; and azo red can vary from about 60 to about 70 wt.%. These concentrations are appreciably higher than prior art concentrates.

In corresponding fashion, the amount of waxy substance also varies from about 15 to about 49 wt.%, depending on the major amount of pigment used. Thus, with carbon black, the amount of waxy additive can vary from about 20 to about 40 wt.%. When using iron oxide pigment, the finished composition can contain from about 15 to about 25 wt.% waxy additive, while a phthalocyanine blue- or benzidine yellow-based composition can have from about 25 to about 40 wt.% waxy portion. An azo red pigment is typically mixed with 30–40 wt.% wax. If the waxy material is in flake or solid form, the material can be milled to a desirable particle size before mixing with the pigment.

The method of preparing these pigment compositions, so that they are dispersible in various resins, can result in two different physical forms of the finished composition. In the preparation, the components can be mixed at or near the melting temperature of the waxy additive in a mixer, such as in a drum or a Henschel mixer, resulting in a fused mixture of pigment and additive, with the pigment having a thin coating, such as a monolayer, of additive. This processing gives a powdered form of the pigment concentrate, often in an agglomerated form that needs to be milled to obtain particles that have a size that gives rapid dispersion.

In some cases, a powdered concentrate is not easily handled, due to a dust problem. The powdered form of the pigment concentrate is then further processed by screening the milled mixture, such as through a 10 or 30 mesh screen, and beading the screened and milled mixture to the desired hardness. This second method of processing gives a pigment concentrate that is easily handled, has a high pigment loading, is readily dispersible in thermoset plastics and thermoplastics, and yet requires less equipment than do prior art methods.

The finished pigment concentrate, either in powdered or beaded form, is then mixed in the desired concentration with the proper plastic to give the final pigmented plastic. This portion of the art is wellknown and need not be discussed here.

Prior art procedures are discussed in the U.S. patents mentioned above. In contrast, a typical procedure, to illustrate the invention concerning a composition and a method of preparing it, is described below.

Carbon black (70 g.), such as Raven 1000, produced by Cities Service Co., having a particle size range of about 29 m$\mu$ is mixed with an aliphatic fatty acid amide (5 g.), such as Armid HT, produced by Armour Industrial Chemical Co., an emulsifiable synthetic polyethylene wax (5 g.), such as Epolene E15, produced by Eastman Chemical Products, and a polyethylene glycol (20 g.), grade 4000, such as Carbowax 4000, produced by Union Carbide. The components are blended, using either a high speed mixer, such as Henschel, without heat, or a lower speed mixer, such as propeller or a drum beader, with heat, to effect a fusing or melting of the waxy components so that the pigment particles are coated. The temperature range for this operation is typically between about 140° F. (60° C.) and 215° F. (102° C.), depending on the type of waxy materials used. The temperature is usually about the highest melt temperature of the waxy materials. A minimum temperature is required to ensure the melting of the waxy components and coating of the pigment particles, and a maximum temperature guards against deterioration of the composition components. Depending on the materials and the apparatus used, the mixing time is in the range of 5 to 20 minutes.

If the waxy components are in flake or crumb form, they are milled, such as by a fluid energy mill or a micropulverizer, to reduce the particle size to that comparable with the pigments used.

In our experience, the process of fusing the pigment and waxy materials results in some agglomeration of the particles. This requires fluid energy milling to give a product with a desirable particle size in the micron range, to promote dispersion when the coated pigment is mixed with the resin to form a color concentrate. The milled mixture can be screened and beaded, for better handling.

Using the above procedure, the following examples illustrate the breadth and value of the composition and method of preparation.

EXAMPLE 1

Using the above-described procedure, 70 g. of carbon black (Raven 1000), 5 g. of an aliphatic fatty acid amide (Armid HT, produced by Armour), 5 g. of a synthetic wax (4 G wax, produced by Michel and Reed Co.), and 20 g. of PEG (Carbowax 4000-Union Carbide) were mixed in a heated Waring Blender at 200° F. (93° C.) for 15 minutes.

EXAMPLES 2–11

| | Component | Amount (g) |
|---|---|---|
| (2) | Fatty acid amide (Armid HT) | 5 |
| | Synthetic polyethylene wax (Epolene E-11) | .5 |
| | PEG (Carbowax 4000) | 20 |
| | Carbon black (Raven 1100) | 70 |

The mixture was heated in a resin kettle, at 212° F. (100° C.) for 10 minutes.

| | | |
|---|---|---|
| (3) | Aliphatic fatty acid amide (EW-425, hexamethylene-bis-12-hydroxy stearamide, from NL Industries) | 25 |
| | PEG (Carbowax 6000) | 10 |
| | Carbon black (Raven 2000) | 65 |

The mixture was heated in a beading drum, at 180° F. (82° C.), for 20 minutes.

| | | |
|---|---|---|
| (4) | Aliphatic amide (Armid HT) | 4 |
| | Synthetic polyethylene (Epolene N-11) | 1 |
| | Synthetic wax (Thix-seal 435-Baker Chemical Co.) | 1 |
| | PEG (Carbowax 4000) | 20 |
| | Carbon black (Raven 1000) | 70 |

The mixture was heated at 180° F. in a resin kettle for 10 minutes.

| | | |
|---|---|---|
| (5) | Aliphatic amide (EW-425) | 20 |
| | PEG (Carbowax 6000) | 5 |
| | Chrome green (Polymon Green; Imperial Chemicals, Inc.) | 75 |

The pigment was preheated to 180° F. (82° C.) and then mixed with the other ingredients in a beading drum, at 180° F., for 20 minutes.

| | | |
|---|---|---|
| (6) | Aliphatic amide (EW-425) | 20 |
| | PEG (Carbowax 6000) | 5 |
| | Chrome yellow (Primrose Chrome Yellow - Hercules, Inc.) | 75 |

The mixture was heated in a resin kettle, at 180° F. (82° C.) for 5–10 minutes.

| | | |
|---|---|---|
| (7) | Aliphatic amide (EW-425) | 28 |
| | PEG (Carbowax 4000) | 2 |
| | Benzidine Yellow AAA(Harshaw Chemical Co.) | 70 |

The ingredients were mixed in a heated Waring Blender at 180° F. (82° C.) for 15 minutes.

| | | |
|---|---|---|
| (8) | Aliphatic amide (EW-425) | 12 |
| | PEG (Carbowax 6000) | 3 |
| | Iron Oxide (Mapico 347 Red-Cities Service) | 85 |

The ingredients were mixed in a pre-heated Henschel mixer at 180° F. (82° C.) for 5 minutes.

| | | |
|---|---|---|
| (9) | Aliphatic amide (EW-425) | 28 |
| | PEG (Carbowax 6000) | 2 |
| | Phthalocyanine Blue (American Cyanamid C.) | 70 |

The ingredients were mixed in a Henschel mixer at 180° F. (82° C.) for 5 minutes.

| | | |
|---|---|---|
| (10) | Paraffin wax (Pacemaker 27, Cities Service) | 10 |
| | PEG (Carbowax 4000) | 10 |
| | Ethylene-vinyl acetate copolymer (AC-405, 15% vinyl acetate, Allied Chemical Corp.) | 5 |
| | Hydrocarbon resin (Piccolyte-Hercules Inc.) | 5 |
| | Carbon black (Raven 2000) | 70 |

The ingredients were heated in a resin kettle at 190° F. for 10 minutes.

| | | |
|---|---|---|
| (11) | Aliphatic amide (Armid HT) | 5 |
| | Ethylene-vinyl acetate copolymer (AC-405) | 5 |
| | PEG (Carbowax 4000) | 15 |
| | Spermaceti (Ross Waxes) | 5 |
| | Carbon black (Raven 1000) | 70 |

The mixture was heated in a resin kettle at 200° F. for 10 minutes.

The above compositions were dispersed in resins, such as polyethylene, ABS, polystyrene, and polyesters.

Testing of the above mixtures, as regards quality of dispersion in various resins, was done by visual inspection of extruded polymer in the form of film, by visual inspection of polymer fiber extruded by plug free operation, and by viewing, on a light microscope, microtomed slices of the color resin. Samples were prepared by extruding virgin resin and the concentrated composition of the invention, using 1 wt.% of concentrate in the finished dispersion. The extrusion was done without intermediate letdown. In all cases, dispersions prepared from the compositions according to the invention were clear and free of residue and aggregates. In contrast, prior art compositions were extruded with difficulty and showed poor dispersion of the pigment in the finished polymer, as evidenced by the presence of discrete pigment particles.

The compositions of the present invention, compared with prior art compositions, (a) are easy to make, (b) require no additional equipment for preparation that is not already present in the factory of a typical resin-polymer processor, (c) can be used directly, without let-down from a concentrate, (d) are compatible with thermoset and thermoplastic resins, (e) can be used in extrusion, molding, and thermoforming machines, and (f) require fewer shipping and storage facilities.

We claim:

1. A pigment composition, dispersible in plastics, comprising
   (a) a majority, by weight, of an organic or inorganic pigment,
   (b) a lesser amount, compared with (a), of a waxy material formed from a mixture of
       (I) at least one of the substances selected from the group consisting of waxes selected from the group consisting of natural waxes, synthetic waxes, and petroleum waxes, and
       (II) at least one of the wax-like polymers selected from the group consisting of polyethylene glycols and hydrocarbon resins.

2. The composition of claim 1, wherein
   (a) the pigments are selected from the group consisting of inorganic prime pigments, organic prime pigments, carbon blacks, and inert or extended pigments,
   (b) the synthetic waxes are synthetic hydrocarbon waxes and their derivatives and are selected from the group consisting of
       (1) Fischer-Tropsch waxes and their derivatives,
       (2) Ziegler process waxes,
       (3) polyethylene waxes and polyethylene-containing copolymers, and
       (4) aliphatic acid amides and
   (c) the natural waxes are selected from the group consisting of
       1—animal waxes,
       2—vegetable waxes, and
       3—mineral waxes, and
   (d) the petroleum waxes are selected from the group consisting of
       1—paraffin wax and
       2—microcrystalline wax.

3. The composition of claim 1, wherein
   (a) the weight %, based on the finished composition, of the pigment varies from about 51 to about 85,
   (b) the weight % of the non-pigment portion varies from about 15 to about 49, and
   (c) the molecular weight range of the polyethylene glycols is 600–20,000.

* * * * *